US006851305B2

(12) United States Patent
Vierling et al.

(10) Patent No.: US 6,851,305 B2
(45) Date of Patent: Feb. 8, 2005

(54) UTILIZING INCREASING WIDTH FOR IDENTIFICATION VOLTAGES

(75) Inventors: Lou Vierling, E. Detroit, MI (US); Larry Hiltunen, Rochester Hills, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

(21) Appl. No.: 10/184,471

(22) Filed: Jun. 27, 2002

(65) Prior Publication Data

US 2004/0000192 A1 Jan. 1, 2004

Related U.S. Application Data

(62) Division of application No. 09/686,253, filed on Oct. 11, 2000, now Pat. No. 6,536,268.

(60) Provisional application No. 60/162,838, filed on Nov. 1, 1999.

(51) Int. Cl.[7] .............................................. G01M 15/00

(52) U.S. Cl. .................................................... 73/119 A

(58) Field of Search ............................... 73/116, 117.2, 73/117.3, 118.1, 119 A, 119 R; 701/101, 102, 103, 104

(56) References Cited

U.S. PATENT DOCUMENTS 3,689,734 A * 9/1972 Burley et al. ............ 219/130.5
4,764,751 A * 8/1988 Kimura ...................... 341/140
4,972,293 A * 11/1990 Verner ........................ 361/187
4,975,848 A * 12/1990 Abe et al. ...................... 701/32
5,003,478 A * 3/1991 Kobayashi et al. ........... 701/32
5,038,289 A * 8/1991 Abe ............................ 701/99
5,491,631 A * 2/1996 Shirane et al. ................ 701/35
6,112,720 A * 9/2000 Matta ......................... 123/446
6,247,451 B1 * 6/2001 Estevenon et al. .......... 123/456
6,321,593 B1 * 11/2001 Rich ......................... 73/118.1
6,516,658 B1 * 2/2003 McCoy et al. ............ 73/119 A
6,536,268 B1 * 3/2003 Vierling et al. ........... 73/119 A
2001/0035817 A1 * 11/2001 Mizuta ....................... 340/438

FOREIGN PATENT DOCUMENTS

EP 0195194 A2 1/1986
EP 0404275 A1 9/1986

OTHER PUBLICATIONS

International Search Report dated Mar. 19, 2002.

* cited by examiner

*Primary Examiner*—Eric S. McCall

(57) ABSTRACT

A method and system is disclosed by which identification codes for a plurality of systems are utilized to provide a control with an indication of a particular characteristic of the particular system. The characteristic is assigned with an identifying variable, in a disclosed embodiment voltage, which increases. As this variable increases, possible errors due to system features will also increase. Thus, the possibility of the control misreading an identification code due to the error increases. To address this increasing possibility, the distance between adjacent variables also increases as the variables themselves increase. In a preferred embodiment the distance is increased proportionally.

10 Claims, 3 Drawing Sheets

Bin Widths for IDM2 Injector Identification

Uniform Bin Width

| E to uP Volts | E from inj Volts | E @ 39.2k Volts | I @ 39.2k Millamps | I @ 30.0k Millamps | I @ IDres Millamps | Rinj (ideal) Kohms | Nearest Std. Value Kohms | Lower Limit Volts | Upper Limit Volts | Bin# | AtoD Min | AtoD Mid | AtoD Max |
|---|---|---|---|---|---|---|---|---|---|---|---|---|---|
| 1.000 | 3.000 | 45.000 | 1.148 | 0.100 | 1.048 | 2.863 | 2.87 | 0.917 | 1.090 | 1 | 188 | 205 | 223 |
| 1.189 | 3.567 | 44.433 | 1.133 | 0.119 | 1.015 | 3.516 | 3.48 | 1.090 | 1.296 | 2 | 223 | 244 | 266 |
| 1.414 | 4.242 | 43.758 | 1.116 | 0.141 | 0.975 | 4.351 | 4.32 | 1.297 | 1.542 | 3 | 266 | 290 | 316 |
| 1.682 | 5.046 | 42.954 | 1.096 | 0.168 | 0.928 | 5.440 | 5.49 | 1.543 | 1.834 | 4 | 316 | 344 | 376 |
| 2.000 | 6.000 | 42.000 | 1.071 | 0.200 | 0.871 | 6.885 | 6.81 | 1.834 | 2.181 | 5 | 376 | 410 | 447 |
| 2.378 | 7.134 | 40.686 | 1.043 | 0.238 | 0.805 | 8.865 | 8.87 | 2.181 | 2.593 | 6 | 447 | 487 | 531 |
| 2.828 | 8.484 | 39.516 | 1.008 | 0.283 | 0.725 | 11.698 | 11.8 | 2.594 | 3.084 | 7 | 531 | 579 | 632 |
| 3.364 | 10.092 | 37.908 | 0.967 | 0.336 | 0.631 | 16.003 | 15.8 | 3.085 | 3.668 | 8 | 632 | 689 | 751 |
| 4.000 | 12.000 | 36.000 | 0.918 | 0.400 | 0.518 | 23.150 | 23.2 | 3.668 | 4.362 | 9 | 751 | 819 | 893 |

Fig-4

| Bin# | A to D Minimum | A to D Ideal | A to D Measured | A to D Maximum |
|---|---|---|---|---|
| 1 | 188 | 205 | 210 | 223 |
| 2 | 223 | 244 | 245 | 266 |
| 3 | 266 | 290 | 294 | 316 |
| 4 | 316 | 344 | 349 | 376 |
| 6 | 447 | 487 | 497 | 531 |
| 7 | 531 | 579 | 579 | 632 |
| 8 | 632 | 689 | 688 | 751 |
| 9 | 751 | 819 | 828 | 893 |

Fig-5

UTILIZING INCREASING WIDTH FOR IDENTIFICATION VOLTAGES

This application is a divisional of U.S. patent application Ser. No. 09/686,253 filed Oct. 11, 2000 (now U.S. Pat. No. 6,536,268), which in turn claims priorty to U.S. Provisional Application No. 60/162,838 filed on Nov. 1, 1999.

BACKGROUND OF THE INVENTION

This invention relates to a method of increasing the width of a band of voltages associated with a particular identification code as the voltages themselves increase.

The present invention is specifically directed to a disclosed system wherein an identification voltage is associated with particular types of fuel injectors to provide a control feedback on characteristics of those fuel injectors. A series of distinct voltages are associated with different combinations of two characteristics. The control can read an electric signal which is influenced by the voltages, and can thus identify the particular combination of characteristics. One problem with this type of system is the reduction or elimination of identification errors. Thus, it would be desirable to minimize the occurrences of when a particular monitored voltage is associated with a particular set of characteristics by the control, but wherein the injector actually possesses a different set of characteristics than that which the control has identified.

A number of different factors can influence the occurrence of such errors. As an example, a disclosed embodiment utilizes resistors to provide the coding identification voltages. Of course, as with any manufactured items, there are tolerances within the resistors. Thus, the resistors themselves can result in errors in the voltage. Moreover, the voltage source which drives the entire system may also vary from the predicted voltage source values, which can also result in errors.

It is has been found that when errors in the voltage source occur, the errors are effectively almost proportional to the voltage. Further, when the errors are due to an error in the resistance in the resistors being utilized to provide the identification voltage, the error is almost proportional to the voltage.

As the voltages associated with codes increase, and as the number of codes themselves increase, the possible errors thus also increase. As the possible error increases, the likelihood of a misreading error also increases if the differences between the voltage associated with adjacent codes are equally spaced.

While the invention is disclosed with regard to voltage identification of codes for use in identifying characteristics of fuel injectors, any system which utilizes an increasing voltage as an identification code for particular characteristics can benefit from this invention. In fact, any system which has an increasing variable for identifying a plurality of codes, be it voltage or some other variable, will benefit from this invention.

SUMMARY OF THE INVENTION

In the disclosed embodiment of this invention, an identification voltage is associated with a number of systems. Distinct identification voltages are identified with distinct combinations of characteristics for each of a plurality of types of systems. The distance between adjacent voltages, and the associated band between minimum and maximum for each of the codes increase as the voltage itself increases.

In this way, with increasing voltage the possible error will increase, but since the band or distance between the adjacent codes also increases, the likelihood of a reading error is maintained small.

In a disclosed embodiment, the codes are associated with a pair of characteristics with regard to fuel injectors. However, the identification voltages can be associated with other types of systems. Further, the invention would also extend to coding variables other than voltage.

In a preferred embodiment, a value for the center of each of the identification values is first determined. Preferably, a value at the center of the uppermost bin and the lowermost bin are first selected. In a disclosed embodiment, the value of voltage at the center of the uppermost bin is 4.0 volts and the value at the lower most bin center is 1.0 volts. A quotient is then determined by dividing these two values. In a most preferred embodiment the log of this quotient is taken. Either a common or a natural log may be used. The log of the quotient is then divided by the number of desired bins minus one. The antilog is then taken. The antilog is then utilized to scale up the value of each of the centers of each of the identification codes. To determine boundaries between each of the codes a second factor may be calculated by taking the square root of the antilog factor. The lower limit is found by dividing the value of the center of the bin of each of the coding values by this second factor. The upper limit is found by multiplying the value at the center of the bin by this second factor. In this way, the bins or identification codes are proportionally spaced.

These and other features of the present invention can be best understood from the following specification and drawings, the following of which is a brief description.

BRIEF DESCRIPTION OF THE DRAWINGS

FIG. 4 shows representative values of example systems.

FIG. 5 shows test results according to the present invention.

DETAILED DESCRIPTION OF A PREFERRED EMBODIMENT

Figure 1:
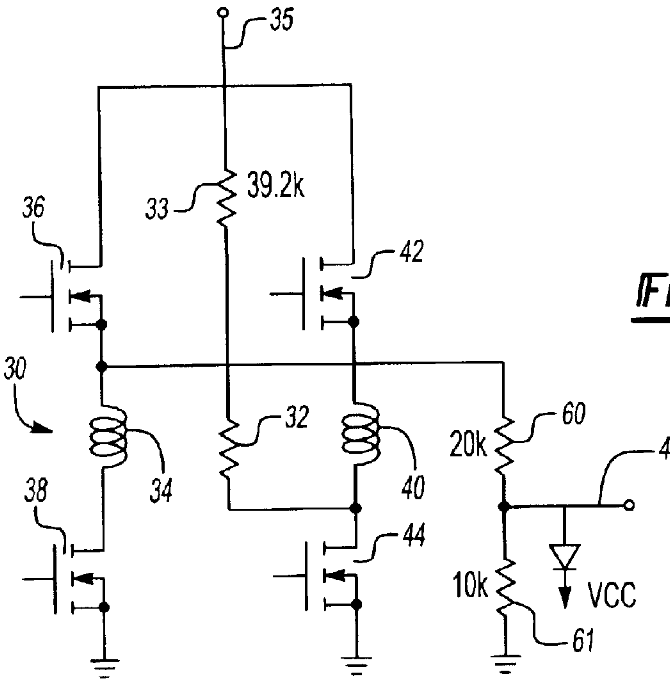
FIG. 1 is a schematic view of a fuel injector driver system according to this invention.

FIG. 1 shows a fuel injector system 30 wherein a representative resistor 32 is varied to provide a plurality of output codes. This circuit, its benefits and further details are all best explained in co-pending U.S. patent application Ser. No. 09/536,365 filed on Mar. 27, 2000, and entitled "IDENTIFICATION OF DIESEL ENGINE INJECTOR CHARACTERISTICS". This co-pending application was invented by one of the inventors of this application.

Figure 2:
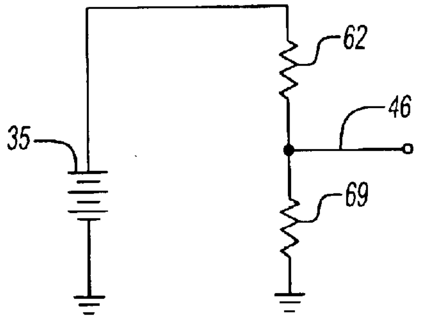
FIG. 2 is a schematic view showing the main features of the FIG. 1 embodiment for purposes of understanding this invention.

Open and close coils 34 and 40 are associated with upper and lower drivers 36 and 38, and 42 and 44, respectively. A connection 35 to a voltage source passes through a resistance 33. Resistors 60 and 61 lead to a connection 46 which is associated with a control. By controlling the drivers 36, 38, 42 and 44, and selectively energizing certain drivers, a control can sense an output voltage from this circuit. In a disclosed embodiment, all of the drivers are left open, with the driver 44 closed. The circuit then becomes effectively as shown in FIG. 2, with the resistances 62 and 69 providing an output at 46 which is influenced by the value of the resistor 32. As explained more fully in the above-referenced patent application, fuel injectors have been found to have individual characteristics which vary in at least two distinct variables. A series of codes can be divided between 1 and 9 to identify three different levels of each of the two characteristics for each injector. Each injector would have one of the three levels of each of the two characteristics, and between those two characteristics there would thus be 9 possible combinations of characteristics. The fuel injector would be tested and assigned a particular code. Again, these aspects of the invention are explained in greater detail in the above-referenced United States Patent Application. Once the individual code has been selected a particular resistance 32 will be associated into the driving circuit for the particular fuel injector. A control may then sense the characteristics of the particular fuel injector, and can control the particular fuel injector accordingly.

Figure 3:
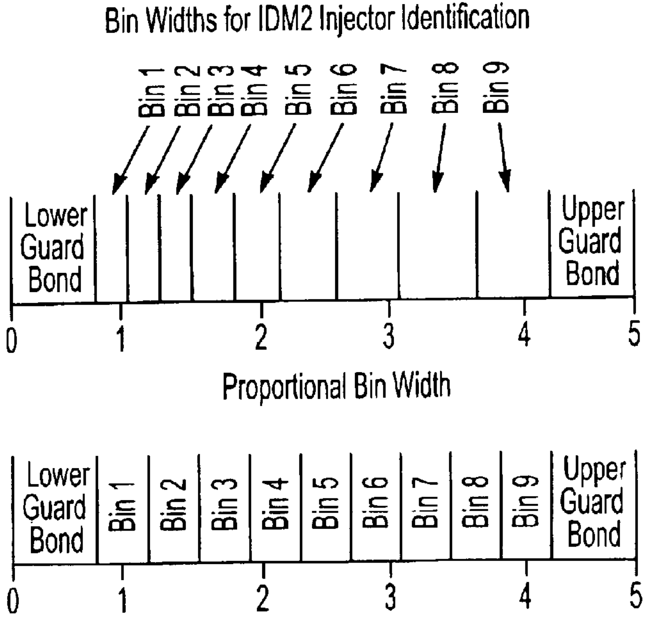
FIG. 3 schematically shows the difference between nine different identification codes which are spaced proportionally, and which are spaced by a uniform width.

As shown in FIG. 3, the distance between adjacent codes or bins can either be uniformly spaced or proportionally spaced. As explained above, with uniform spacing, the likelihood of a reading error at higher bin numbers is increased. Thus, the present invention discloses the concept of increasing the width between adjacent voltages as the value of the voltage increases. More particularly, the present invention desirably uses proportional spacing.

In a preferred embodiment of this invention, an upper and lower center value for each of the bins is selected. The quotient of those two values is then obtained, and the logarithm of that quotient is taken. The logarithm of this quotient may be either a common or a natural log. The logarithm of the quotient is then divided by the desired number of bins minus one. The antilog of the result is then taken. In one example, the upper voltage center may be 4.0 volts and the lower voltage center may be 1.0 volts. In such a system the quotient would be 4.0. The log of 4.0 is 0.6021. When 0.6021 is divided by eight (9 bins−1) the result is 0.0753. The antilog of this value is 1.1892. The value of voltage at the center of each of the nine bins may then be calculated by multiplying this number by the voltage at the center of the next lower bin. As an example:

| Bin No. | Voltage No. |
|---|---|
| 1 | 1.00 |
| 2 | (1.00 × 1.1892) = 1.1892 |
| 3 | (1.1892 × 1.1892) = 1.4142 |
| 4 | (1.4142 × 1.1892) = 1.6818 |
| 5 | (1.6818 × 1.1892) = 2.00 |
| 6 | (2.00 × 1.1892) = 2.3784 |
| 7 | (2.3784 × 1.1892) = 2.8284 |
| 8 | (2.8284 × 1.1892) = 3.3636 |
| 9 | (3.3636 × 1.1892) = 4.00 |

To determine the boundaries between bins a second factor may be calculated by taking the square root of the first factor. The square root of 1.1892 is 1.0905. For each bin a lower limit may be found by dividing the value at the center by this factor. An upper limit may be found by multiplying the value of the center of the bin by the factor. As an example, for bin 5 the lower limit equals 2.00/1.0905 or 1.8340. The upper limit equals 2.00×1.0905 or 2.181.

FIG. 4 shows the idealized Kohms for the resistor 32 and the nearest standard value in Kohms of resistors. The upper and lower limits in voltage for each of the bin value is also included. In systems built according to this invention, testing has shown that the number of errors will be greatly minimized. FIG. 5 shows an analog to digital conversion of the voltage values for each of the nine bins, along with idealized and measured values of particular fuel injectors.

Although the present invention does disclose a preferred embodiment wherein the distance between the bins are proportional, and where logarithms are used to calculate those values, it should be understood that any change in the spacing between adjacent coding values wherein the spacing distance increases as the value of the variable increases would come within the broad scope of this invention. Moreover, while the present invention is disclosed for identifying codes associated with fuel injectors, other systems will benefit from this invention.

While a preferred embodiment of this invention has been disclosed, a worker in this art would recognize that many modifications would come within the scope of this invention. For that reason, the following claims should be studied to determine the true scope and content of this invention.

What is claimed is:

1. A system comprising:

a component having individual characteristics which vary due to manufacturing tolerances; and said component being provided with an identification code to provide a variable identification to a control, said identification code being an electric signal of a strength associated with any one of a plurality of possible identification codes which increase in strength, and a distance between signals associated with adjacent identification codes increasing as said strength increases.

2. A system as set forth in claim 1, wherein said identification code is a voltage.

3. A system as set forth in claim 2, wherein the distance between adjacent identification codes increases proportionally as said voltage increases.

4. A system as set forth in claim 1, wherein said component is a fuel injector.

5. A system comprising:

a plurality of components each having individual characteristics, said individual characteristics being assigned to a plurality of distinct types of characteristics; and an identification code built into each of said plurality of components, said identification code providing an indication to a control of said characteristics for each of said components, and said identification code being a variable which increases in distance between an adjacent code as said variable increases.

6. A plurality of components as set forth in claim 5, wherein said variable is a voltage value.

7. A plurality of components as set forth in claim 6, wherein said voltage value increase proportionally in distance from adjacent voltage values.

8. A plurality of components as set forth in claim 7, wherein the distance between adjacent voltage values is determined by utilizing logarithms.

9. A plurality of components as set forth in claim 8, wherein upper and lower limits for each of said values which are utilized by said control to identify whether a particular read variable is within any one of said identification codes are determined by utilizing logarithm function.

10. A plurality of components as set forth in claim 5, wherein said components are fuel injectors each having a pair of characteristics which can vary, and there being a plurality of possible combinations of said characteristics.

* * * * *